(12) United States Patent
Ritland

(10) Patent No.: US 8,528,340 B2
(45) Date of Patent: Sep. 10, 2013

(54) TURBINE ENGINE FLOW SLEEVE

(75) Inventor: David M. Ritland, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 1245 days.

(21) Appl. No.: 12/180,657

(22) Filed: Jul. 28, 2008

(65) Prior Publication Data

US 2010/0018208 A1  Jan. 28, 2010

(51) Int. Cl.
*F02C 7/22* (2006.01)

(52) U.S. Cl.
USPC ............................................ 60/760; 60/737

(58) Field of Classification Search
USPC ................... 60/737–740, 743, 752, 755–758, 60/760, 796
See application file for complete search history.

(56) References Cited

U.S. PATENT DOCUMENTS

| | | | |
|---|---|---|---|
| 2,920,449 A | 1/1960 | Johnson et al. | |
| 4,928,481 A | 5/1990 | Joshi et al. | |
| 5,069,029 A * | 12/1991 | Kuroda et al. | 60/776 |
| 5,150,570 A * | 9/1992 | Shekleton | 60/804 |
| 5,177,955 A | 1/1993 | Shekleton | |
| 5,323,600 A | 6/1994 | Munshi | |
| 5,454,221 A | 10/1995 | Loprinzo | |
| 5,487,275 A | 1/1996 | Borkowicz et al. | |
| 5,575,154 A | 11/1996 | Loprinzo | |
| 5,901,555 A * | 5/1999 | Mandai et al. | 60/747 |
| 5,937,653 A | 8/1999 | Alary et al. | |
| 6,065,282 A | 5/2000 | Fukue et al. | |
| 6,109,038 A * | 8/2000 | Sharifi et al. | 60/737 |
| 6,487,860 B2 | 12/2002 | Mayersky et al. | |
| 6,513,334 B2 | 2/2003 | Varney | |
| 6,796,130 B2 | 9/2004 | Little et al. | |
| 6,843,061 B2 | 1/2005 | Parker et al. | |
| 6,883,329 B1 * | 4/2005 | Martling | 60/746 |
| 6,883,332 B2 * | 4/2005 | Steinthorsson et al. | 60/776 |
| 6,996,991 B2 | 2/2006 | Gadde et al. | |
| 7,028,483 B2 | 4/2006 | Mansour et al. | |
| 7,080,515 B2 | 7/2006 | Wasif et al. | |
| 7,082,770 B2 | 8/2006 | Martling et al. | |
| 7,117,679 B2 * | 10/2006 | Toon et al. | 60/740 |
| 7,216,488 B2 | 5/2007 | Howell et al. | |
| 7,249,461 B2 | 7/2007 | Moraes | |
| 7,546,739 B2 | 6/2009 | Holland et al. | |
| 2004/0055306 A1 | 3/2004 | North et al. | |
| 2006/0101801 A1 | 5/2006 | Bland | |

(Continued)

OTHER PUBLICATIONS

David J. Wiebe, Timothy A. Fox; "Combustor Assembly in a Gas Turbine Engine"; U.S. Appl. No. 12/431,302, filed Apr. 28, 2009; pp. 1-26.

(Continued)

*Primary Examiner* — Andrew Nguyen

(57) ABSTRACT

A flow sleeve for use in a turbine engine including a compressor section, a combustion section, and a turbine section downstream from the combustion section. The flow sleeve includes a sleeve wall defining a pre-mixing passage of the combustion section and has a forward end proximate to a cover plate of the combustion section and an opposed aft end. The sleeve wall includes a first wall section extending axially from the sleeve wall forward end and a second wall section extending from the first wall section between the forward and aft ends of the sleeve wall toward the aft end of the sleeve wall. A cavity is formed between the first wall section and the second wall section.

20 Claims, 3 Drawing Sheets

(56) References Cited

U.S. PATENT DOCUMENTS

| | | |
|---|---|---|
| 2007/0130958 A1 | 6/2007 | Ohri et al. |
| 2007/0157616 A1* | 7/2007 | Hernandez et al. ............ 60/740 |
| 2007/0220898 A1 | 9/2007 | Hessler |
| 2007/0234724 A1 | 10/2007 | Prociw et al. |
| 2008/0083225 A1 | 4/2008 | Fish et al. |

OTHER PUBLICATIONS

L.B. Davis and S.H. Black; Dry Low NOx Combusion Systems for GE Heavy-Duty Gas Turbines, GE Power Systems GER-3568G article, Oct. 2000, pp. 1-22, USA.

* cited by examiner

TURBINE ENGINE FLOW SLEEVE

CROSS REFERENCE TO RELATED APPLICATION

This application is related to U.S. patent application Ser. No. 12/180,637, filed concurrently herewith entitled "INTEGRAL FLOW SLEEVE AND FUEL INJECTOR ASSEMBLY", the entire disclosure of which is incorporated by reference herein.

FIELD OF THE INVENTION

The present invention relates to a turbine engine flow sleeve, and more particularly, to a flow sleeve including structure for providing fuel to a pre-mixing passage and for affecting the flow of air through the pre-mixing passage.

BACKGROUND OF THE INVENTION

In gas turbine engines, compressed air discharged from a compressor section and fuel introduced from a source of fuel are mixed together and burned in a combustion section. The mixture is directed through a turbine section, where the mixture expands to provide rotation of a turbine rotor. The turbine rotor may be linked to an electric generator, wherein the rotation of the turbine rotor can be used to produce electricity in the generator.

The combustion section of a typical gas turbine engine may include a fuel injector assembly that distributes fuel into the compressed air stream before the stream reaches main and pilot fuel injectors of a combustion chamber in a process referred to as pre-mixing. The pre-mixing process provides a high degree of flexibility during engine tuning and is an important component for engine emissions and dynamics.

One type of prior art fuel injector assembly comprises a ring-type fuel injector assembly including a fuel ring, a fuel supply tube, and attachment legs for attaching the assembly to a portal or flow sleeve of the combustion section of the engine. Fuel is delivered from a source of fuel to the fuel supply tube, which conveys the fuel to the fuel ring. The fuel is delivered into the air stream through an annular array of apertures that are formed in a radially inward surface of the fuel ring. Such a prior art fuel injector assembly is disclosed in U.S. Pat. No. 7,249,461, the entire disclosure of which is hereby incorporated by reference.

SUMMARY OF THE INVENTION

In accordance with a first aspect of the present invention, a flow sleeve is provided for use in a turbine engine including a compressor section, a combustion section, and a turbine section downstream from the combustion section. The flow sleeve comprises a sleeve wall defining a pre-mixing passage of the combustion section and has a forward end proximate to a cover plate of the combustion section and an opposed aft end. The sleeve wall includes a first wall section extending axially from the sleeve wall forward end and a second wall section extending from the first wall section between the forward and aft ends of the sleeve wall toward the aft end of the sleeve wall. A cavity is formed between the first wall section and the second wall section.

In accordance with a second aspect of the present invention, a flow sleeve is provided for use in a turbine engine comprising a compressor section, a combustion section, and a turbine section downstream from the combustion section. The flow sleeve comprises an annular sleeve wall defining a pre-mixing passage of the combustion section having a forward end proximate to a cover plate of the combustion section and an opposed aft end. The sleeve wall includes a first wall section extending axially from the sleeve wall forward end to the sleeve wall aft end and a second wall section having a conical shaped portion and a cylindrical shaped portion. The conical shaped portion extends from the first wall section between the forward and aft ends of the sleeve wall. The cylindrical shaped portion extends from the conical shaped portion to the aft end of the sleeve wall. A cavity is formed between the first wall section and the second wall section.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
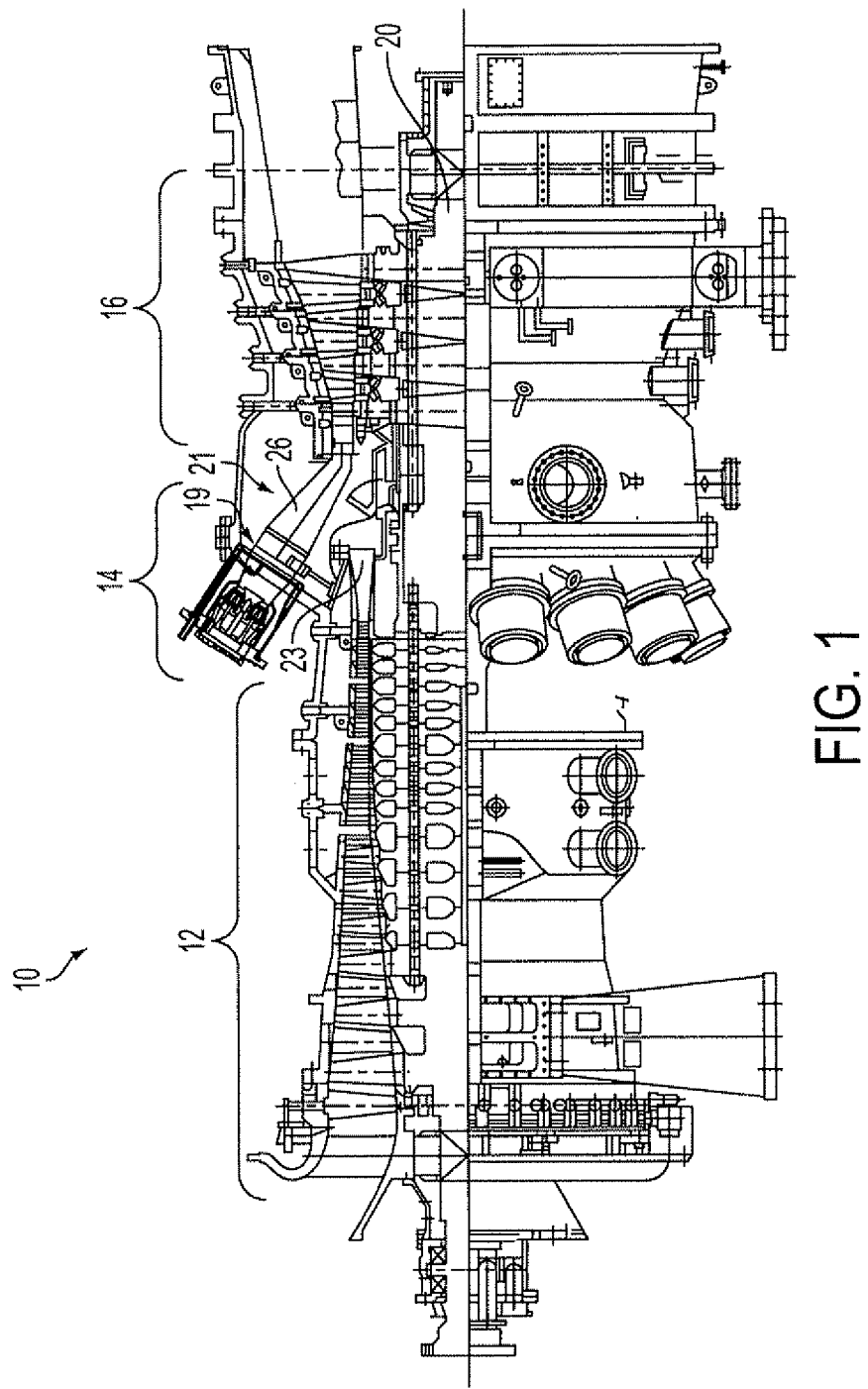
FIG. 1 is a sectional view of a gas turbine engine including a plurality of combustors according to an embodiment of the invention.

Referring to FIG. 1, a gas turbine engine 10 is shown. The engine 10 includes a compressor section 12, a combustion section 14 including a plurality of combustors 13, and a turbine section 16. The compressor section 12 inducts and pressurizes inlet air which is directed to the combustors 13 in the combustion section 14. Upon entering the combustors 13, the compressed air from the compressor section 12 is pre-mixed with a fuel in a pre-mixing passage 18 (see FIG. 2). The pre-mixed fuel and air then flows into a combustion chamber 14A where it is mixed with fuel from one or more main fuel injectors 15 and a pilot fuel injector 17 (see FIG. 2) and ignited to produce a high temperature combustion gas flowing in a turbulent manner and at a high velocity. The combustion gas then flows through a transition 26 to the turbine section 16 where the combustion gas is expanded to provide rotation of a turbine rotor 20 as shown in FIG. 1.

Figure 2:
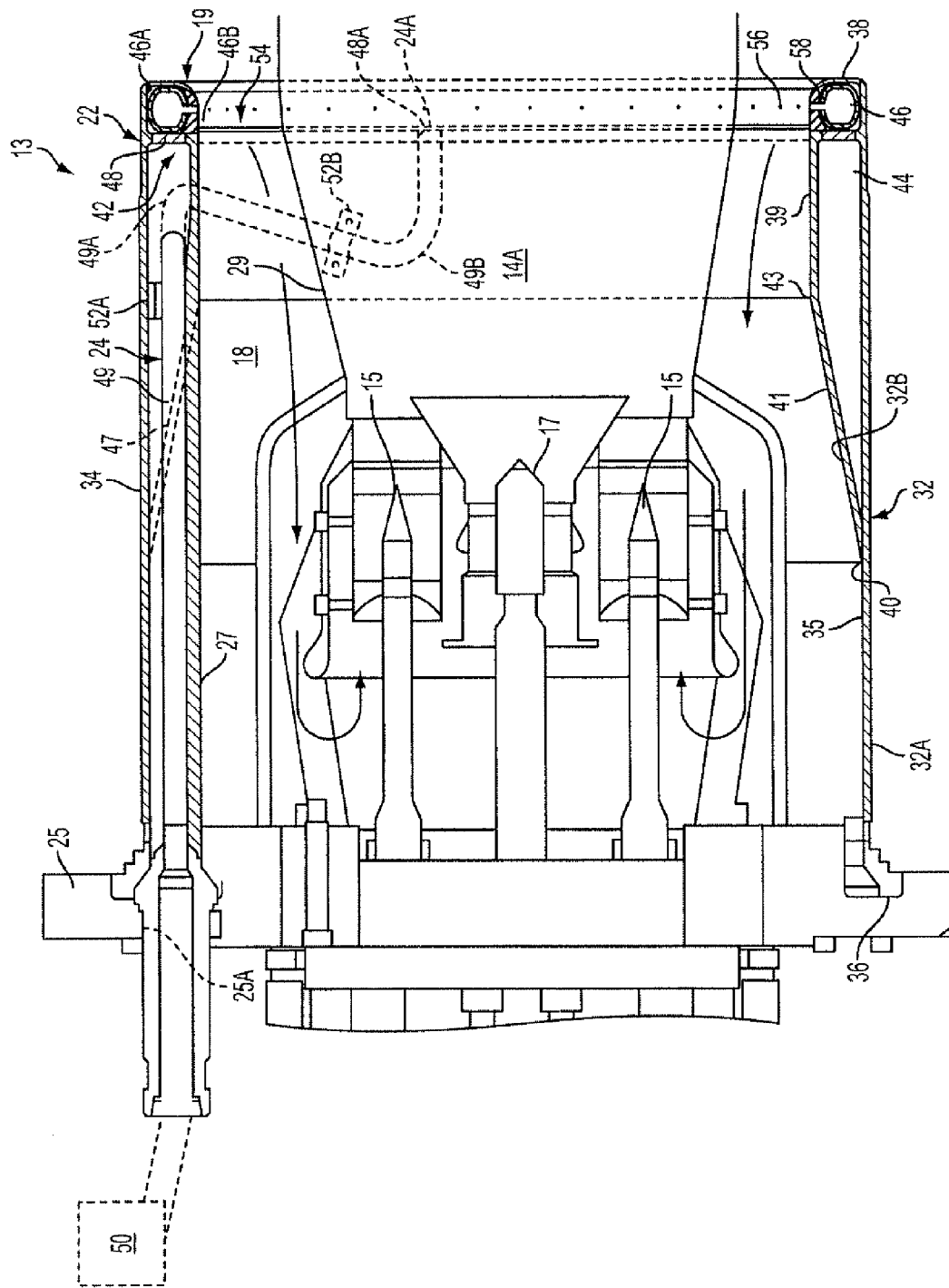
FIG. 2 is a side cross sectional view of one of the combustors shown FIG. 1.

Referring to FIG. 2, the pre-mixing passage 18 is defined by a pre-mix fuel injector assembly 19 comprising a flow sleeve 22 surrounding a liner 29 of the combustion chamber 14A. The flow sleeve 22 may have a generally cylindrical configuration and may comprise an annular sleeve wall 32 that defines the pre-mixing passage 18 between the sleeve wall 32 and the liner 29. The flow sleeve 22 may be manufactured in any manner, such as, for example, by a casting procedure. Further, the sleeve wall 32 may comprise a single piece or section of material or a plurality of joined individual pieces or sections, and may be formed from any material capable of operation in the high temperature and high pressure environment of the combustion section 14 of the engine 10, such as, for example, stainless steel or carbon steel, and in a preferred embodiment comprises a steel alloy including chromium.

As shown in FIG. 2, the sleeve wall 32 includes a radially outer surface 34, a radially inner surface 35, a forward end 36, and an aft end 38 opposed from the forward end 36. The forward end 36 is affixed to a cover plate 25, i.e., with bolts (not shown). The aft end 38 defines an air inlet from a combustor plenum 21 (see FIG. 1), which receives the compressed air from the compressor section 12 via a compressor section exit diffuser 23 (see FIG. 1). The radially outer surface 34 is defined by a substantially cylindrical first wall section 32A that extends axially between the forward end 36 and the aft end 38. In the embodiment shown, the radially inner surface 35 is partially defined by the first wall section 32A and is partially defined by a second wall section 32B. The second wall section 32B comprises a conical shaped portion 41 and cylindrical shaped portion 39. The second wall section 32B is affixed to and extends from the first wall section 32A at an interface 40, as may be further seen in FIG. 2A. The second wall section 32B may be affixed to the first wall section 32A by any conventional means, such as by welding.

Figure 2A:
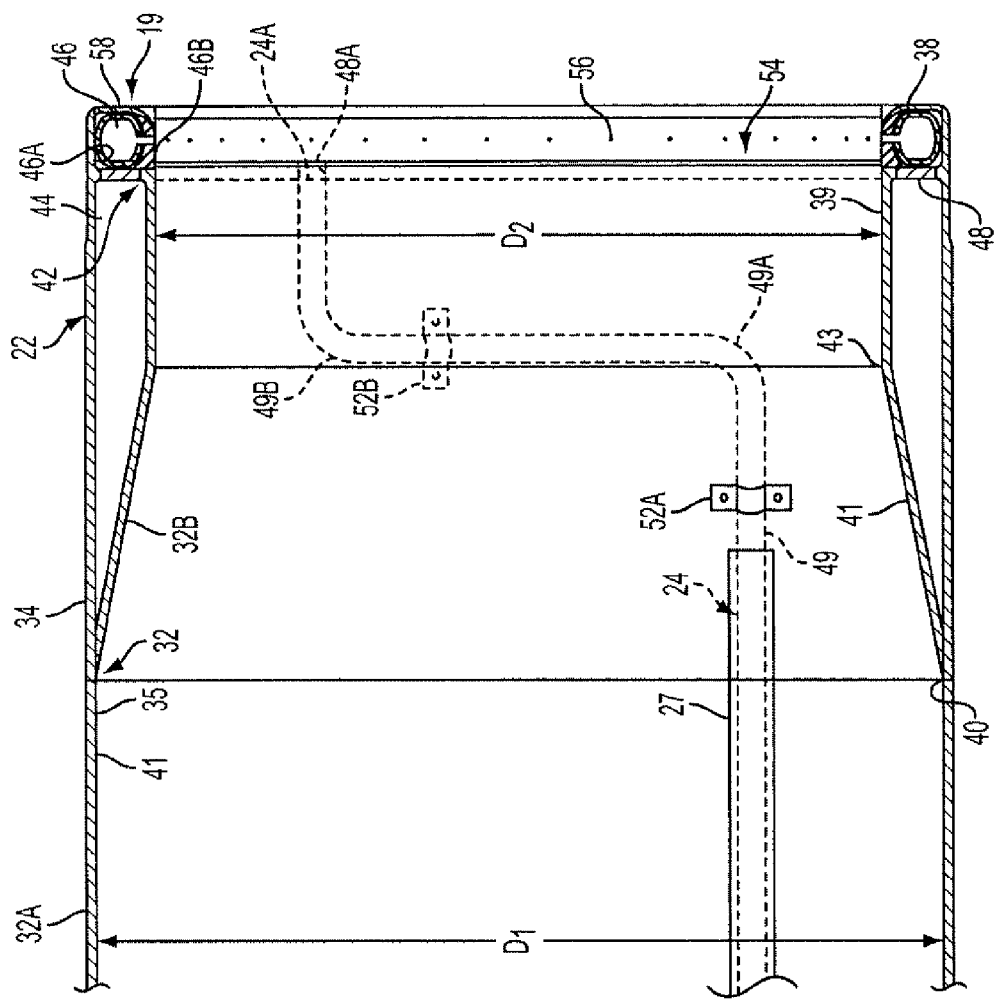
FIG. 2A is a side cross sectional view of the pre-mix fuel injector assembly illustrated in FIG. 2 shown removed from the combustor.

As seen in FIGS. 2 and 2A, the conical portion 41 of the second wall section 32B defines a transition between two inner diameters of the sleeve wall 32 extending axially between the forward end 36 and the aft end 38. Specifically, the conical portion 41 transitions between a first, larger inner diameter $D_1$, located adjacent to the forward end 36, and a second, smaller inner diameter $D_2$, located adjacent to the aft end 38 (see FIG. 2A). It is understood that the sleeve wall 32 may have a substantially constant diameter if desired, or the diameter $D_2$ of the aft end 38 could be greater than the diameter $D_1$ of the forward end 36.

Referring to FIGS. 2 and 2A, a cavity 42 is defined in the sleeve wall 32 adjacent to the sleeve wall aft end 38 between the first and second wall sections 32A, 32B. In the preferred embodiment, the cavity 42 comprises a first portion defining a transition chamber 44 and a second portion defining an annular fuel supply chamber 46, but may comprise any number of portions, including a single portion.

In the illustrated embodiment, the fuel supply chamber 46 is separated from the transition chamber 44 by a web member 48 extending radially between the first and second wall sections 32A, 32B and dividing the cavity 42 into the transition chamber 44 and the fuel supply chamber 46. It should be noted that although the web member 48 is illustrated as comprising a separate piece of material attached to the first and second wall sections 32A, 32B, the web member 48 could also be provided as integral with either or both of the first and second wall sections 32A, 32B of the sleeve wall 32.

The annular fuel supply chamber 46 comprises an annular channel 46A formed in the sleeve wall 32 and defines a fuel flow passageway for supplying fuel around the circumference of the sleeve wall 32 for distribution to the pre-mixing passage 18. The annular channel 46A may be formed in the sleeve wall 32 by any suitable method, such as, for example, by bending or forming the end of the sleeve wall 32 or by machining the annular channel 46A into the sleeve wall 32. In the embodiment shown, the annular channel 46A preferably extends circumferentially around the entire sleeve wall 32, but may extend around only a selected portion of the sleeve wall 32. Optionally, the fuel supply chamber 46 may be provided with a thermally resistant sleeve 58 therein, i.e., a sleeve formed of a material having a high thermal resistance. Additional description of the annular channel 46A and the thermally resistant sleeve 58 may be found in the above-noted U.S. patent application Ser. No. 12/180,637.

Referring to FIG. 2, the flow sleeve 22 further comprises a fuel feed passageway 24 provided for receiving a fuel supply tube 49 that is in fluid communication with a source of fuel 50 and extends through an aperture 25A in the cover plate 25. As may be further seen in FIG. 2A, the fuel feed passageway 24 is defined by a U-shaped cover structure 27 that is affixed to the inner surface 35 of the sleeve wall 32, such as by welding, for example, and is further defined by a slot or opening 47 (FIG. 2) defined in the second wall section 32B at the conical portion 41. The cover structure 27 isolates the fuel supply tube 49 from the hot gases flowing through the pre-mixing passage 18 by substantially preventing the hot gases from entering the fuel feed passageway 24. Hence, the fuel supply tube 49 provides fluid communication for conveying fuel between the source of fuel 50 and the fuel supply chamber 46 of the cavity 42 by passing through the aperture 25A in the cover plate 25, through the fuel feed passageway 24, including the opening 47, and through the transition chamber 44 of the cavity 42.

Referring to FIG. 2A, the fuel supply tube 49 is affixed to the web member 48, for example, by welding, such that a fluid outlet 24A of the fuel supply tube 49 is in fluid communication with the fuel supply chamber 46 of the cavity 42 via an aperture 48A formed in the web member 48. Preferably, as most clearly shown in FIG. 2A, the fuel supply tube 49 may include a series of bends 49A, 49B or circumferential direction shifts within the transition chamber 44 of the cavity 42, so as to provide the fuel supply tube 49 with an S-shape. The bends 49A, 49B may reduce stress to the fuel supply tube 49 caused by a thermal expansion and contraction of the fuel supply tube 49 and the flow sleeve 22 during operation of the engine 10, accommodating relative movement between the fuel supply tube 49 and the sleeve wall 32, such as may result from thermally induced movement of one or both of the fuel supply tube 49 and sleeve wall 32. The fuel supply tube 49 may be secured to the sleeve wall 32 at various locations with fasteners 52A, 52B, illustrated herein by straps, as seen in FIGS. 2 and 2A. It should be understood that other types of fasteners could be used and could be employed in different locations than those illustrated in FIGS. 2 and 2A.

Referring to FIGS. 2 and 2A, a fuel dispensing structure 54 is associated with the annular channel 46A and, in the preferred embodiment, comprises an annular segment 46B of the sleeve wall 32 adjacent the aft end 38. In the embodiment shown, the annular segment 46B is provided as a separate element affixed in sealing engagement over the annular channel 46A to form a radially inner boundary for the annular channel 46A, and is configured to distribute fuel into the pre-mixing passage 18. For example, the annular segment 46B may be welded to the sleeve wall 32 at first and second welds (not shown) on opposed sides of the annular channel 46A at an interface between the annular segment 46B and the sleeve wall 32 to create a substantially fluid tight seal with the sleeve wall 32. It should be noted that other means may be provided for affixing the annular segment 46B to the sleeve wall 32 and that the annular segment 46B of the fuel dispensing structure 54 could be formed integrally with the sleeve wall 32. The fuel dispensing structure 54 is further described in the above-noted U.S. patent application Ser. No. 12/180, 637.

The fuel dispensing structure 54 further includes a plurality of fuel distribution apertures 56 formed in the annular segment 46B. In a preferred embodiment, the fuel distribution apertures 56 comprise an annular array of openings or through holes extending through the annular segment 46B.

The fuel distribution apertures 56 may be substantially equally spaced in the circumferential direction, or may be configured in other patterns as desired, such as, for example, a random pattern. The fuel distribution apertures 56 are adapted to deliver fuel from the fuel supply chamber 46 to the pre-mixing passage 18 at predetermined circumferential locations about the flow sleeve 22 during operation of the engine 10. The number, size and locations of the fuel distribution apertures 56, as well as the dimensions of the fuel supply chamber 46, are preferably configured to deliver a predetermined flow of fuel to the pre-mixing passage 18 for pre-mixing the fuel with incoming air as the air flows to the combustion chamber 14A.

Since the cover structure 27 is formed integrally with the flow sleeve 22, the possibility of damage to the fuel supply tube 49, which may occur during manufacturing, maintenance, or operation of the engine 10, for example, may be reduced by the present design. Further, the cover structure 27 and the transition chamber 44 of the cavity 42 prevent direct contact and provide a barrier for the fuel supply tube 49 from vibrations that would otherwise be imposed on the fuel supply tube 49 by the gases flowing through the pre-mixing passage 28. Accordingly, damage caused to the fuel supply tube 49 by such vibrations is believed to be avoided by the current design.

Moreover, the aft end 38 of the sleeve wall 32 provides a relatively restricted flow area at the entrance to the pre-mixing passage 18 and expands outwardly in the flow direction producing a venturi effect, i.e., a pressure drop, inducing a higher air velocity in the area of the fuel dispensing structure 54. The higher air velocity in the area of the fuel dispensing structure 54 facilitates heat transfer away from the liner 29 and substantially prevents flame pockets from forming between the sleeve wall 32 and the liner 29, which could result in flames attaching to and burning holes in the sleeve wall 32, the liner 29, and/or any other components in the vicinity. Further, while the pressure drop provided at the aft end 38 of the sleeve wall 32 is sufficient to obtain the desired air velocity increase adjacent to the fuel dispensing structure 54, a substantial pressure is maintained along the length of the flow sleeve 22 in order to limit the production of $NO_x$ in the fuel/air mixture between the sleeve wall 32 and the liner 29.

The web member 48 located at the aft end 38 of the sleeve wall 32 forms an I-beam structure with the first and second wall sections 32A, 32B to strengthen and substantially increase the natural frequency of the flow sleeve 22 away from the operating frequency of the combustor 13. For example, the operating frequency of the combustor 13 may be approximately 300 Hz, and the natural frequency of the flow sleeve 22 is increased by the I-beam stiffening structure to approximately 450 HZ. Hence, damaging resonant frequencies in the flow sleeve 22 are substantially avoided by the increase in the natural frequency provided by the present construction.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flow sleeve for use in a turbine engine comprising a compressor section, a combustion section, and a turbine section downstream from the combustion section, the flow sleeve comprising:

a sleeve wall defining a pre-mixing passage where fuel is mixed with air before entering a combustion chamber defined by a liner of the combustion section, the pre-mixing passage being defined between the liner and the sleeve wall with the sleeve wall being located radially outwardly from the liner, the sleeve wall having a forward end proximate to a cover plate of the combustion section and an opposed aft end, said sleeve wall comprising;

a first wall section extending axially from said sleeve wall forward end; and a second wall section extending from said first wall section between said forward and aft ends of said sleeve wall toward said aft end of said sleeve wall, wherein a cavity is formed between said first wall section and said second wall section; and a cover structure located at least partially forward of said second wall section and affixed to a radially inner surface of said sleeve wall and housing a fuel supply tube in fluid communication with a source of fuel for delivering fuel from said source of fuel to said pre-mixing passage.

2. The flow sleeve according to claim 1, wherein said cavity is formed in said sleeve wall adjacent to said sleeve wall aft end.

3. The flow sleeve according to claim 1, wherein said sleeve wall comprises an annular sleeve wall and said cavity comprises an annular channel defining a fuel flow passageway between said first and second wall sections.

4. The flow sleeve according to claim 3, further comprising a fuel dispensing structure associated with said fuel flow passageway for distributing fuel from said annular channel to said pre-mixing passage.

5. The flow sleeve according to claim 1, wherein said cover structure extends substantially axially along and is affixed to a radially inner surface of said first wall section and terminates at an opening formed in said second wall section.

6. The flow sleeve according to claim 5, wherein said fuel supply tube extends through said cover plate, within said cover structure, and through said opening formed in said second wall section into said cavity.

7. The flow sleeve according to claim 1, further comprising a web member disposed in said cavity extending radially between said first and second wall sections.

8. The flow sleeve according to claim 7, wherein said web member divides said cavity into a first portion and a second portion.

9. The flow sleeve according to claim 8, wherein said second portion of said cavity comprises a fuel flow passageway for delivering fuel to said pre-mixing passage.

10. The flow sleeve according to claim 1, wherein said sleeve wall comprises different inner diameters located at different axial locations along said flow sleeve.

11. The flow sleeve according to claim 10, wherein said forward end of said sleeve wall comprises a first inner diameter and said aft end of said sleeve wall comprises a second inner diameter, said first inner diameter being greater than said inner second diameter.

12. A flow sleeve for use in a turbine engine comprising a compressor section, a combustion section and a turbine section downstream from the combustion section, the flow sleeve comprising:

an annular sleeve wall defining a pre-mixing passage where fuel is mixed with air before entering a combustion chamber defined by a liner of the combustion section with the sleeve wall being located radially outwardly from the liner, a fuel dispensing structure distributing fuel into said pre-mixing passage, the sleeve wall having a forward end proximate to a cover plate of the combustion section and an opposed aft end, wherein said fuel dispensing structure extends from said cover plate proximate to said forward end of said sleeve wall, said sleeve wall comprising;
a first wall section extending axially from said sleeve wall forward end to said sleeve wall aft end;
a second wall section radially inward from said first wall section and comprising a conical shaped portion and a cylindrical shaped portion, said conical shaped portion extending from said first wall section between said forward and aft ends of said sleeve wall, said cylindrical shaped portion extending from said conical shaped portion to said aft end of said sleeve wall, wherein a cavity is formed between said first wall section and said second wall section and wherein the premixing passage is defined radially between said second wall section and the liner.

13. The flow sleeve according to claim 12, wherein said cavity comprises an annular channel defining a fuel flow passageway between said first and second wall sections.

14. The flow sleeve according to claim 13, wherein the fuel dispensing structure is associated with said fuel flow passageway for distributing fuel from said annular channel to said pre-mixing passage.

15. The flow sleeve according to claim 13, further comprising a cover structure affixed to a radially inner surface of said sleeve wall adapted to house a fuel supply tube in fluid communication with a source of fuel for delivering fuel from said source of fuel to said fuel flow passageway.

16. The flow sleeve according to claim 15, wherein said cover structure extends substantially axially along and is affixed to a radially inner surface of said first wall section and terminates at an opening formed in said second wall section.

17. The flow sleeve according to claim 12, further comprising a web member disposed in said cavity and extending radially between said first and second wall sections, wherein said web member divides said cavity into a first portion and a second portion, said second portion comprising a fuel flow passageway for delivering fuel to said pre-mixing passage.

18. The flow sleeve according to claim 12, wherein said sleeve wall comprises different inner diameters located at different axial locations along said flow sleeve.

19. The flow sleeve according to claim 18, wherein said forward end of said sleeve wall comprises a first inner diameter and said aft end of said sleeve wall comprises a second inner diameter, said first inner diameter being greater than said inner second diameter.

20. The flow sleeve according to claim 16, wherein said fuel supply tube extends through said cover plate, within said cover structure, and through said opening formed in said second wall section into said cavity.

* * * * *